Nov. 2, 1971  R. T. CATIGNANI  3,616,563
REEL ATTACHMENT
Filed Jan. 27, 1970

INVENTOR:
ROBERT T. CATIGNANI

United States Patent Office 3,616,563
Patented Nov. 2, 1971

3,616,563
REEL ATTACHMENT
Robert Thomas Catignani, Fort Lee, N.J., assignor to The Garcia Corporation
Filed Jan. 27, 1970, Ser. No. 6,231
Int. Cl. A01k 87/06
U.S. Cl. 43—22      3 Claims

ABSTRACT OF THE DISCLOSURE

A spinning reel is attached to a fishing rod handle, the spinning reel having a stalk terminating in a flat foot having an enlarged end. The fishing rod handle has a rear flange and a smaller diameter extension thereof, said rear flange and said extension containing a vertical opening longer than the width of said enlarged end of said foot. The opening has sides shaped to conform to the profile of said foot so that the stalk, after passing through the opening, may be rotated 90° to seat in the opening, after which locking means is advanced over said extension to clamp said foot in the front end of said opening.

BACKGROUND OF THE INVENTION

Heretofore, spinning reels have had an upwardly extending stalk with a foot that is detachably fixed to the handle of a fishing rod. In operation, the fingers of a user grasping the handle adjacent to the reel have extended on each side of the stalk. Thus, a user must shift his hand at least a finger width along the handle if he wishes to change his grip to manipulate the reel. This invention provides a more secure reel attachment from the butt of a fishing rod handle.

DESCRIPTION OF THE PREFERRED EMBODIMENT

Figure 4:
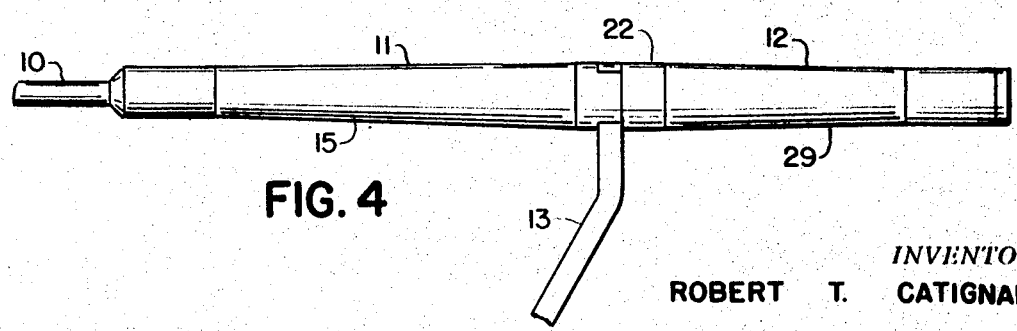
FIG. 4 is a side view of a fragment of a reel stalk attached to a fishing rod handle having a butt extension.

As shown in FIG. 4, a fishing rod 10 has a handle 11 to which there is attached a butt extension 12. The butt extension 12 does not form a part of this invention and may be replaced with a shorter element. A conventional spinning reel (not shown) has a rearwardly and upwardly extending stalk 13 which is releasably secured in the rod handle 11.

Figure 1:
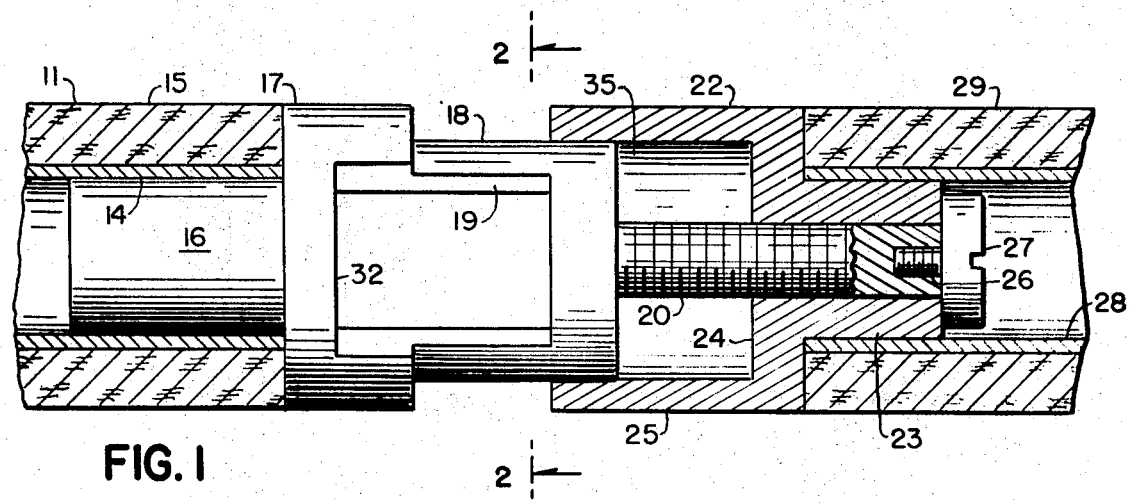
FIG. 1 is a top view of assembled fragments of a fishing rod handle and a butt extension adapted to receive the foot of a reel stalk, portions of the handle and the butt extension being shown in horizontal section.

As shown in FIG. 1, handle 11 has a tube 14 surrounded by a cork hand grip 15. A central projection 16 is fixed in tube 14 and has the rear flange 17 formed integrally with it. A smaller diameter extension 18 projects rearwardly from flange 17. A vertical opening 19 is formed through both flange 17 and extension 18.

An externally-threaded element 20 projects from extension 18 and has the locking member 22 screwed about it. Member 22 has a rearwardly-extending portion 23 containing internal threads, a front flange 24 extending outward therefrom, and a forward-extending cylindrical portion 25. Cylindrical portion 25 contains the cavity 35 which receives extension 18 allowing portion 25 to extend about extension 18. Screw 26 having the large head 27 is turned into the end of threaded element 20 to prevent the removal of member 22.

If a butt extension 12 is provided, a tube 28 is fixed about portion 23 and has a cork hand grip 29 disposed about it.

Figure 2:
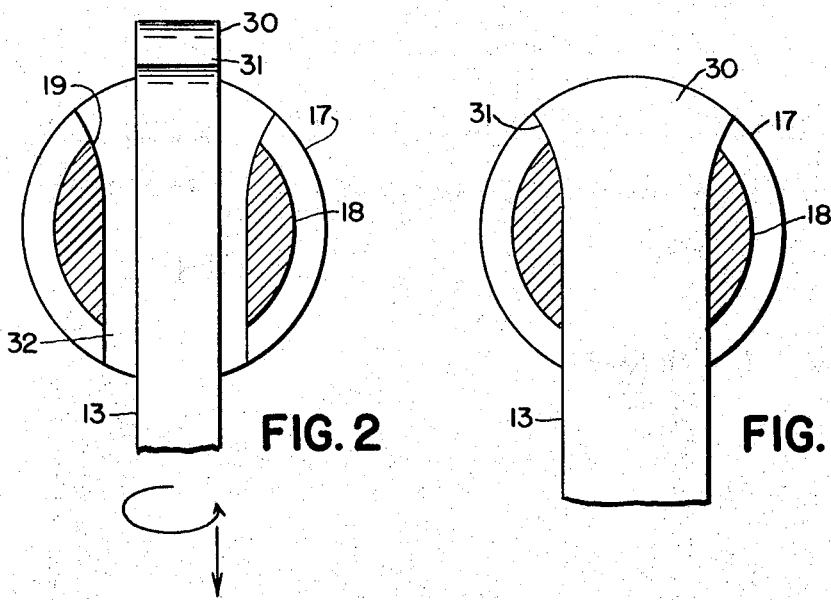
FIG. 2 is a section taken on line 2—2 of FIG. 1 showing a fragment of a reel stalk being inserted in the handle.
Figure 3:
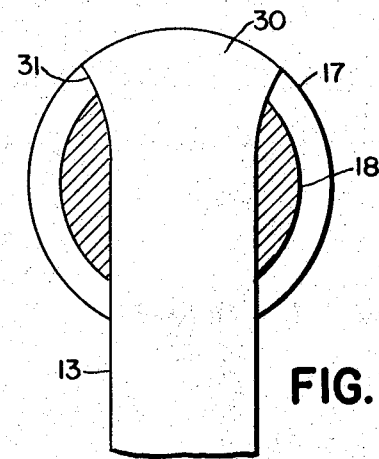
FIG. 3 is a section taken on line 2—2 of FIG. 1 showing a fragment of a reel stalk inserted and positioned in the handle.

As shown in FIGS. 2 and 3, stalk 13 has a flat-sided end 30 which is laterally extended to provide the enlarged end 31. The sides of opening 19 are shaped to conform to the profile of the end 30 of stalk 13. Opening 19 is longer than the width of end 30 so that stalk 13 may be passed upward therethrough, rotated axially through 90 degrees, moved forward to end 32, and clamped in place by screwing member 22 forward.

This invention enjoys many advantages. Screw 26 prevents the loss of locking member 22. Even should locking member 22 accidentally become unscrewed, stalk 13 will be held from dropping downward by its enlarged end 31. It is only by loosening locking member 22 and axially rotating stalk 13 through 90 degrees that it can be removed. Finally, this particular structure more tightly and firmly clamps a reel stalk 13 to a rod handle 11.

What is claimed is:

1. An attachment to fix a spinning reel to a fishing rod comprising, in combination, a rod handle having a rear flange, a smaller diameter extension of said rear flange, said flange and said extension containing a vertical opening, a stalk of a reel having a transversely flattened foot with an enlarged upper end, said opening being longer than the width of the enlarged upper end of said foot, the sides of said opening in said flange having the same profile as said foot, and locking means extending around said extension adapted to be screwed toward said flange to clamp said foot in the front end of said opening.

2. The combination according to claim 1 with the addition of a threaded element projecting rearwardly from said extension, said locking means having a rearwardly-extending portion containing internal threads screwed on said threaded element, and having a forwardly-extending cylindrical portion containing a cavity extending about said extension, said cylindrical portion clamping said foot against said rear flange.

3. The combination according to claim 2 with the addition of a screw with a head larger than said threaded element turned into the back end of said threaded element, said head blocking removal of said rearwardly-extending portion from said threaded element.

References Cited

UNITED STATES PATENTS

| 3,006,098 | 10/1961 | Harke | 43—22 |
| 3,175,321 | 3/1965 | Stephens | 43—22 |
| 3,295,244 | 1/1967 | Kuntze | 43—22 |

FOREIGN PATENTS

| 1,078,570 | 8/1967 | Great Britain | 43—22 |

SAMUEL KOREN, Primary Examiner
D. J. LEACH, Assistant Examiner